United States Patent Office 3,513,013
Patented May 19, 1970

3,513,013
BRAZING TAPE AND METHOD OF MAKING THE SAME
William Willis and Gordon Bradley, Burnley, England, assignors to Burnley Engineering Products Limited, Burnley, England, a British company
No Drawing. Filed Apr. 19, 1967, Ser. No. 631,919
Claims priority, application Great Britain, June 23, 1966, 28,125/66; Dec. 24, 1966, 57,860/66
Int. Cl. B44d 1/10, 1/12, 1/14
U.S. Cl. 117—31
10 Claims

ABSTRACT OF THE DISCLOSURE

A brazing tape including a base of a hard flexible non-porous plastic material, a coating of a powdered brazing alloy applied to the base, and an air-hardening binding agent which fixes the coating to the base and which is immiscible and unreactive with the base and completely vaporizes on heating. A method of making the brazing tape includes the steps of coating a regulated thickness of a powdered brazing alloy on a base of flexible non-porous plastic material, such as cellulose acetate, and fixing the powdered allow to the base by spraying onto the coating an air-hardening binding agent, such as an acrylic resin, which is immiscible and unreactive with the base and completely vaporizes on heating.

---

This invention relates to a brazing tape and method of making the same.

According to the invention, the method includes the steps of forming a strip comprising a base of a hard flexible non-porous plastic material with a coating of a powdered brazing alloy, applying a portion of said strip to parts to be brazed, and subjecting said parts to a welding process to fuse said alloy to said parts.

Also according to the invention, the brazing tape comprises a strip including a base of a hard flexible non-porous plastics material and a coating of a powdered brazing alloy applied to said base.

One embodiment of the invention will be described by way of example only.

A former in the form of a ring rotatable about a horizontal axis has its periphery constituted by a copper backing with a chromium face. A liquid mixture of 1 part of cellulose acetate to 3 parts of acetone is brushed on to a periphery of the ring, while the ring is rotating, until there is an even coating on said periphery. The coating is allowed to dry and the acetone vaporizes. A finely dispersed brazing alloy (examples of which will be given hereafter) contained in a hopper above the ring is fed from the hopper on to the acetate coating on the periphery of the rotating ring and a liquid mixture of 1 part of an acrylic resin to 4 parts of trichlorethylene is simultaneously sprayed on to said coating to fix the powdered alloy to said coating which serves as a base for the alloy. The powdered alloy is applied to the base until the alloy forms on said base a coating of the desired thickness which is allowed to dry, the trichlorethylene vaporizes, and the alloy and the base are removed from the ring as a tape simply by cutting transversely of the ring, gripping one of the ends of the tape and peeling the tape off the ring. The chromium face prevents the tape sticking to the ring or tearing during its removal from the ring.

The tape is sufficiently flexible to be rolled up and stored, preferably out of contact with the air, until it is required for use.

Examples of brazing alloys for use in the invention are as follows:

EXAMPLE 1

An alloy of powdered gold and powdered nickel, the proportions of the gold and the nickel in the alloy being gold 82% plus or minus 0.3% and nickel 18% plus or minus 0.5%. The melting point of the alloy is 938° C., the specific gravity is 16.1 and the density is 8.45 troy ounces per cubic inch.

When using this alloy, the finished tape after being removed from the ring may be reversed and re-applied to the ring with the alloy coating abutting the periphery of the ring. The ring is rotated, the liquid mixture of acrylic resin and trichlorethylene is sprayed onto the ring and at the same time pure powdered nickel is fed from a hopper onto the resin to form a coating of nickel, the proportion by weight of which to the brazing alloy does not exceed 2%.

The reason for providing a coating of nickel is that the tape can be used for spot brazing at a higher temperature than would be possible with the alloy alone, i.e., at a temperature in excees of 1000° C. which is above that of the melting point of the alloy, because the melting point of nickel is 1455° C.

EXAMPLE 2

An alloy of powdered sliver and powdered manganese, the proportions of the silver and the manganese in the alloy being silver 85% and manganese 15%. The melting point of the alloy is approximately 950° C.

EXAMPLE 3

An alloy known as CM50 and sold by Dewrance & Company Limited of Great Dover St., London SE. 1, the alloy consisting of powdered silicon, boron and nickel. The proportions of these metals in the alloy are silicon 3.5%, boron 1.9% and nickel 94.6%. The melting point of the alloy is approximately 980° C.

EXAMPLE 4

An alloy known as CM52 and sold by the said Dewrance & Company Limited, the alloy consisting of powdered silicon, boron and nickel. The proportions of these metals in the alloy are silicon 4.5%, boron 2.9% and nickel 92.6%. The melting point of the alloy is approximately 965° C.

EXAMPLE 5

An alloy known as CM60 and sold by the said Dewrance & Company Limited, the alloy consisting of powdered silicon, chromium, iron and nickel. The proportions of these metals in the alloy are silicon 10%, chromium 20%, iron 3% and nickel 67%. The melting point of the alloy is approximately 1080° C.

EXAMPLE 6

An alloy known as Orobraze 910 and sold by Johnson Matthey & Co. Ltd., of 73–83 Hatton Gardens, London EC. 1, the alloy consisting of powdered gold, copper and iron. The proportions of these metals in the alloy are gold 80%, copper 19% and iron 1%. The melting point of the alloy is 910–950° C.

EXAMPLE 7

An alloy known as Orobraze 940 sold by the said Johnson Matthey & Co. Ltd. and consisting of powdered gold and copper. The proportions of these metals in the alloy are gold 62.5% and copper 37.5%. The melting point of the alloy is 930–940° C.

EXAMPLE 8

An alloy known as Orobraze 998 and sold by the said Johnson Matthey & Co. Ltd. the alloy consisting of powdered gold and copper. The proportion of these metals in the alloy are gold 37.5% and copper 62.5%. The melting point of the alloy is 980–998° C.

EXAMPLE 9

An alloy known as Orobraze 1018 and sold by the said Johnson Matthey & Co. Ltd. the alloy consisting of powdered gold and copper. The proportions of these metals in the alloy are gold 30% and copper 70%. The melting point of the alloy is 996–1018° C.

EXAMPLE 10

An alloy known as Orobraze 990 and sold by the said Johnson Matthey & Co. Ltd. the alloy consisting of powdered gold and nickel. The proportions of these metals in the alloy are gold 75% and nickel 25%. The melting point of the alloy is 950–990° C.

When using any of the alloys of Examples 2 to 10, a release agent in the form of a high-temperature brazing flux (i.e., one that does not vaporize or lose its effectiveness below about 1000–1100° C.) may be sprayed on to the cellulose acetate coating and allowed to dry before application of the resin and the brazing alloy.

Just prior to use of the tape for brazing, the cellulose acetate base can be readily peeled off the tape taking most of the brazing flux with it and leaving only the alloy coating and resin. Any flux left behind will, however, be beneficial during the brazing process. An advantage of using a release agent is that, during brazing any air or gas trapped between the tape and a part or parts being brazed will escape through the powdered alloy when the resin vaporizes.

When it is desired to braze two parts together, the parts are placed in a jig and a portion of the tape is removed and placed between the surfaces of the parts to be brazed. The parts are then welded, as by spot welding, to fuse the alloy to said parts which are then placed in a furnace to complete the braze, the resin vaporizing during welding.

It has been found that the brazed joint produced by the invention is metallurgically sound even in the presence of the non-metallic cellulose acetate and resin.

The invention has the following advantages:

The thickness of the alloy in the tape may be readily and accurately controlled, merely by controlling the number of revolutions of the ring.

The time saved in brazing two parts together is considerable and a better less expensive joint is obtainable than heretofore because the brazing alloy is easy to apply as it is not necessary to use many of the complicated mechanical fixtures required heretofore, the scrap factor due to faulty brazing or re-brazing is substantially eliminated, excess wastage of brazing alloy due to faulty application is substantially eliminated, and it is not necessary to use loose brazing powder, shim or wire.

The invention is particularly applicable to any brazed joint where high temperature controlled brazing is required.

While in the embodiment described, reference has been made to the use of cellulose acetate as the base of the tape, any hard flexible non-porous plastics material which is insoluble in the resinous adhesive may be used, examples of such plastics material being vinyl plastics, styrol resins, resinamines, acrylate polymers, etc. Also, while reference has been made to the use of an acrylic resin as the resinous adhesive for the alloy coating, any air-hardening binding agent which is immiscible and unreactive with the base and will completely vaporize, leaving no residue behind, at the melting temperature of the alloy may be used, examples of such resins being acrylic resins, vinyl (Vinylites) plastics, etc.

So far as the former ring is concerned there may be provided in lieu of the chromium face a face of, for example, a ceramic or a glass-based enamel.

In certain circumstances, when the brazing tape is applied to a solid surface to be brazed, i.e., a surface having no recesses, apertures etc., there may be a tendency during the brazing process for air pockets to be formed between said surface and the adjacent surface of the tape.

Therefore, after the tape with the coating of brazing alloy has been formed on the ring and removed from the former, the tape may be passed over a pinned roller to perforate the tape.

When the tape is then applied to a solid surface to be brazed any air trapped between said surface and the tape will escape through the perforations in the tape.

We claim:

1. A brazing tape comprising a strip including a base of a hard flexible nonporous plastic material, a coating of a powdered brazing alloy on said base, and an air-hardening binding agent which fixes the coating to the base and which is immiscible and unreactive with the base and which completely vaporizes on heating.

2. A tape as claimed in claim 1, in which the base is cellulose acetate.

3. A tape as claimed in claim 1, in which the binding agent is an acrylic resin.

4. A tape as claimed in claim 1, and a releasing agent in the strip intermediate the base and the alloy coating.

5. A tape as claimed in claim 4, in which the releasing agent is a high-temperature brazing flux that does not vaporize or lose its effectiveness below about 1000–1100° C.

6. A tape as claimed in claim 1, in which the brazing alloy is an alloy of powdered nickel and gold and the face of the base remote from the coating of brazing alloy has a coating of pure powdered nickel fixed to the base by the air-hardening binding agent.

7. A method for manufacturing a brazing tape, comprising the steps of applying a coating of a powdered brazing alloy on a base of a flexible nonporous plastic material and fixing the powdered alloy to said base by means of simultaneously spraying onto said coating an air-hardening binding agent which is immiscible and unreactive with said base and which completely vaporizes on heating.

8. A method as claimed in claim 7, and forming the strip by applying a coating of said plastic material in fluent form to a rotating former to form the base, allowing the base at least partially to harden, applying the brazing alloy in a finely dispersed powdered form to said base to build up on said base a coating of the desired thickness, fixing the powdered alloy to said base with the air-hardening binding agent, and removing the strip from the former.

9. A method as claimed in claim 8, and applying a releasing agent to the base before application of the brazing alloy, and removing the base from that portion of the strip to be used for brazing prior to commencement of brazing.

10. A method as claimed in claim 8, in which the brazing alloy is an alloy of powdered nickel and gold, the strip, after being removed from the former, is reapplied to the stationary former with the brazing alloy coating abutting the former, the former is rotated, the air-hardening binding agent is applied to the face of the strip remote from said alloy coating, a coating of pure powdered nickel is applied to the binding agent, and the strip is removed from the former.

(References on following page)

References Cited

UNITED STATES PATENTS

| | | | | |
|---|---|---|---|---|
| 1,969,569 | 8/1934 | Malocsay | 117—68 | X |
| 2,372,334 | 3/1945 | Murphy. | | |
| 2,688,649 | 9/1954 | Bjorksten | 117—229 | X |
| 2,909,643 | 10/1959 | Graves | 29—501 | X |
| 2,994,762 | 8/1961 | Todd. | | |
| 3,031,344 | 4/1962 | Sher et al. | 117—27 | X |
| 3,350,179 | 10/1967 | Stenerson | 29—501 | X |
| 3,399,070 | 8/1967 | Scharf | 117—68 | X |
| 3,444,613 | 5/1969 | Foerster | 29—501 | X |
| 3,458,923 | 8/1969 | Hoffman | 29—501 | |

ALFRED L. LEAVITT, Primary Examiner

T. E. BOKAN, Assistant Examiner

U.S. Cl. X.R.

29—501, 502; 228—56; 117—29, 68, 71, 145, 33